(12) United States Patent
Yamanaka (10) Patent No.: US 7,808,659 B2
(45) Date of Patent: Oct. 5, 2010

(54) IMAGE FORMING SYSTEM

(75) Inventor: Tsuyoshi Yamanaka, Komaki (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 1374 days.

(21) Appl. No.: 10/942,768

(22) Filed: Sep. 17, 2004

(65) Prior Publication Data

US 2005/0062996 A1   Mar. 24, 2005

(30) Foreign Application Priority Data

Sep. 19, 2003   (JP) .............................. 2003-328271

(51) Int. Cl.
G06F 3/12   (2006.01)

(52) U.S. Cl. ..................... 358/1.11; 358/1.18

(58) Field of Classification Search ................... 358/1.1, 358/1.8, 3.25, 1.11, 3.26–3.27, 3.28–3.32; 382/162–167, 173–180, 181–231, 276–311, 382/312–324

See application file for complete search history.

(56) References Cited

U.S. PATENT DOCUMENTS

2008/0317348 A1* 12/2008 Saito .......................... 382/182

FOREIGN PATENT DOCUMENTS

| JP | 04-173163 A | 6/1992 | |
| JP | 07251534 | * | 3/1994 |
| JP | 07251534 | * | 3/1995 |
| JP | 07251534 | * | 10/1995 |
| JP | 09-141965 A | | 6/1997 |
| JP | 09-212312 A | | 8/1997 |
| JP | A-11-259250 | | 9/1999 |
| JP | A-2000-330916 | | 11/2000 |
| JP | B2-3265097 | | 12/2001 |
| JP | A-2002-373071 | | 12/2002 |
| JP | B2-3400844 | | 2/2003 |

OTHER PUBLICATIONS

Hasegawa Yujata, English translation, Mar. 1995.*
English Translation of JP07251534.*

* cited by examiner

Primary Examiner—King Y Poon
Assistant Examiner—Iriana Cruz
(74) Attorney, Agent, or Firm—Oliff & Berridge, PLC (57) ABSTRACT

In order to transmit fixed-image/text drawing data to print a character contained in a fixed image placed at a predetermined position of paper and body-text drawing data to print a body (text) image in a body, a host apparatus gives the unique download (DL) font ID using a numeric value in different numeric area to each text drawing data stored in external memory attached to a printer. The printer stores the text drawing data identified by the DL font ID in the external memory and upon reception of an image formation command, the printer reads the text drawing data from the external memory and forms an image. Thereby, appropriate text drawing data can be used to print.

5 Claims, 10 Drawing Sheets

| DL FONT ID (FOR BODY IMAGE) |
|---|
| Nx0 |
| Nx1 |
| Nx2 |
| Nx3 |

FIG. 8C

| DL FONT ID | SPECIFIED CHARACTER ID |

IMAGE FORMING SYSTEM

BACKGROUND OF THE INVENTION

1. Field of the Invention

The present invention relates to an image forming system for downloading fixed-image/text drawing data and body-text drawing data from a host apparatus to an image forming apparatus and forming an image.

2. Description of the Related Art

Hitherto, an image forming system has been known wherein to form an image in an image forming apparatus such as a printer, fixed-image data containing such as a logotype printed on each page of paper, and text drawing data of data of font not included as standard in the printer are downloaded from a host apparatus such as a personal computer to the printer and are once stored in printer memory and an image is formed using the data stored in the printer memory. (see Japanese Patent No. 3400844)

The fixed-image data downloaded from a personal computer to a printer is usually implemented as image data (bit map data) however, to decrease the amount of the fixed-image data, there is a demand for using not only image data, but also text data.

SUMMARY OF THE INVENTION

However, if the conventional image forming system described above attempts to print fixed-image data containing text data, since use of text data in fixed-image data is not considered, there occurs a problem that it becomes impossible to distinguish between text drawing data to print the text data contained in the fixed-image data, which will be hereinafter referred to as fixed-image/text drawing data, and text drawing data to print text data contained in body data, which will be hereinafter referred to as body-text drawing data, and it becomes impossible to print using any desired text drawing data.

It is therefore one of objects of the invention to make it possible to select appropriate text drawing data for printing when fixed-image data contains text data in an image forming system wherein fixed-image data and text drawing data are downloaded from a host apparatus to an image forming apparatus for use.

According to a first aspect of the invention, there is provided an image forming system including a host apparatus and an image forming apparatus, wherein the host apparatus includes: a text drawing data transmission unit that transmits text drawing data including first text drawing data for printing a character contained in a fixed image placed at a predetermined position of a recording medium and second text drawing data for printing a character contained in a body; a character identification data determination unit that determines character identification data that is proper to each text drawing data and is uniquely identifying the first text drawing data and the second text drawing data; and a character identification data transmission unit that transmits the character identification data determined by the character identification data determination unit, and wherein the image forming apparatus includes: a storage unit; an image formation unit that forms an image on the recording medium based on the text drawing data stored in the storage unit; a storage control unit that stores the text drawing data and the character identification data both transmitted from the host apparatus in the storage unit in association with each other; and an image formation control unit that reads the text drawing data identified by the character identification data stored in the storage unit and controls the image formation unit to form an image upon reception of an image formation command containing the character identification data.

According to a second aspect of the invention, there is provided an image forming system including a host apparatus and an image forming apparatus, wherein the host apparatus includes: a text drawing data transmission unit that transmits text drawing data including first text drawing data for printing a character contained in a fixed image placed at a predetermined position of a recording medium and second text drawing data for printing a character contained in a body; and an invalidation command transmission unit that transmits an invalidation command, and wherein the image forming apparatus includes: a storage unit that stores the text drawing data transmitted from the host apparatus; an image formation unit that forms an image on the recording medium based on the text drawing data stored in the storage unit; and a text drawing data erasure unit that erases the text drawing data stored in the storage unit after completion of image formation executed by the image formation unit upon reception of the invalidation command.

BRIEF DESCRIPTION OF THE DRAWINGS

These and other objects and advantages of the present invention will become more fully apparent from the following detailed description taken with the accompanying drawings, in which.

DETAILED DESCRIPTION OF THE PREFERRED EMBODIMENTS

Referring now to the accompanying drawings, a description will be given in detail of preferred embodiments of the invention.

First Embodiment

Figure 1:
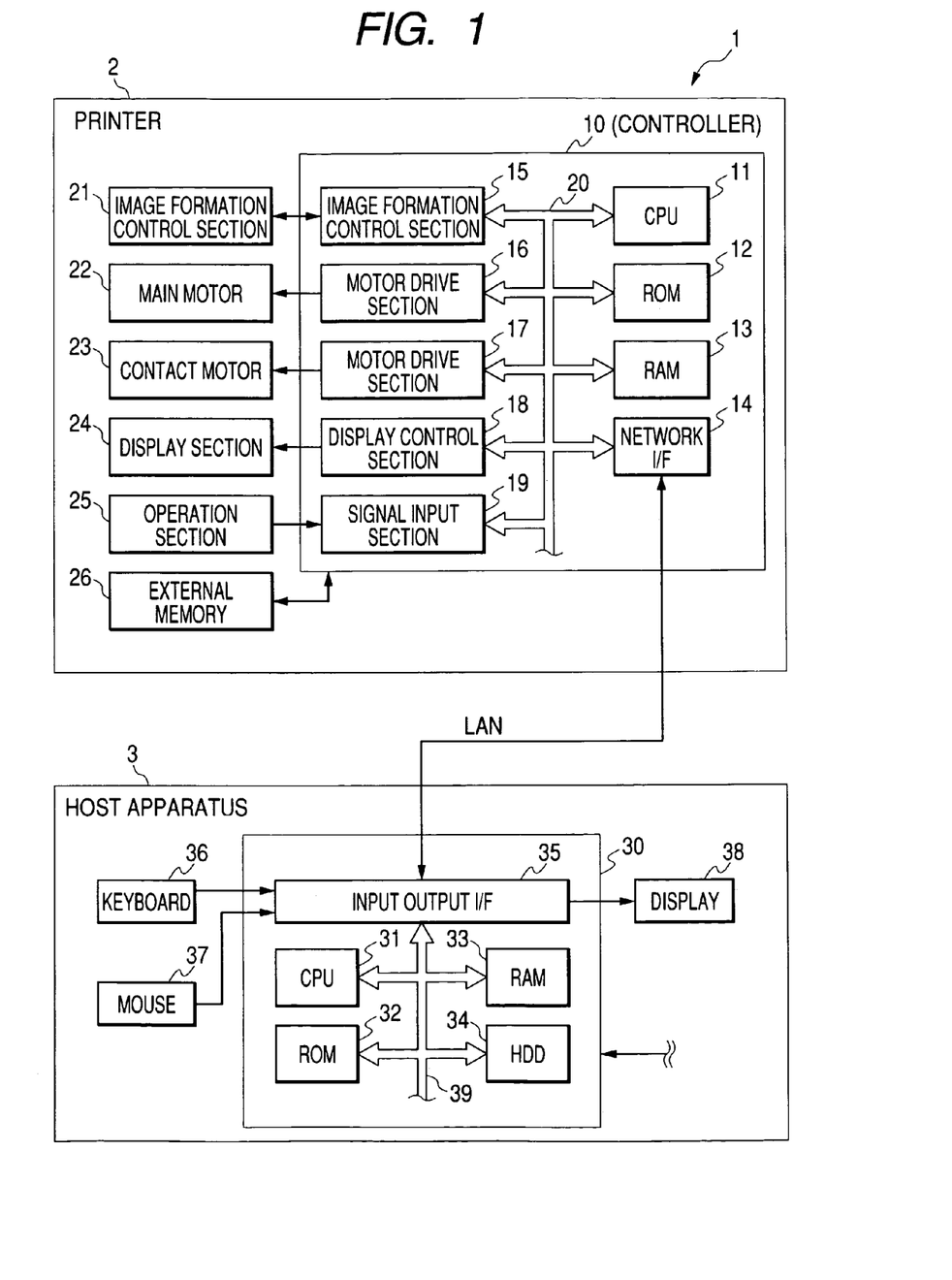
FIG. 1 is a block diagram to show a schematic configuration of an image forming system of a first embodiment of the invention.

FIG. 1 is a block diagram to show a schematic configuration of an image forming system 1 according to a first embodiment of the invention.

As shown in FIG. 1, the image forming system 1 includes a printer 2 and a host apparatus 3 connected to the printer 2 via a network such as a LAN (local area network).

The printer 2 is, for example, a laser printer and is controlled by a controller 10. The controller 10 controls an image formation section 21 for forming an image. A main motor 22 is provided as a power source of a paper transport system of the printer 2. A contact motor 23 is provided as a power source for bringing a developing roller into and out of contact with a photoconductor drum, and the like in accordance with a command entered by the user through an operation section 25 or a command input from an information processing apparatus (in the embodiment, the host apparatus 3) through the network. The controller 10 is implemented as a known microcomputer including components such as CPU 11, ROM 12, RAM 13, and a bus line 20 for connecting the components.

The controller 10 also includes: an image formation control section 15 for controlling the image formation section 21 (in the invention, image formation unit) in accordance with a command from the CPU 11; motor drive sections 16 and 17 for driving the main motor 22 and the contact motor 23 in accordance with a command from the CPU 11; a display control section 18 for displaying the operation state of the printer 2 and the like on a display section 24 implemented as a liquid crystal display in accordance with a command from the CPU 11; a signal input section 19 for inputting a command signal entered by the user through the operation section 25 into the controller 10; and a network interface 14 (network I/F) for conducting data communications with an external information processing apparatus, such as the host apparatus 3, through the network. The sections are connected to the CPU 11, the ROM 12, and the RAM 13 by the bus line 20.

The host apparatus 3 is controlled by a controller 30. The controller 30 is implemented as a known microcomputer including components such as a CPU 31, ROM 32, RAM 33, and a bus line 39. A hard disk drive 34 (HDD) and an input/output interface 35 are connected to the bus line 39. A keyboard 36, a mouse 37, a display 38, a LAN cable for transferring data to and from the printer 2, and the like are connected to the input/output interface 35.

Nonvolatile external memory 26 that can store comparatively high-volume data transmitted from the host apparatus 3 and can be attached to and detached from the printer 2 is attached to the controller 10.

The CPU 11 recognizes the type of command transmitted through the network from an external information processing apparatus. If the command is a print request command, the CPU 11 controls the image formation control section 15 and the main motor 22 in accordance with print data later transmitted through the network, thereby forming an image on paper 50 (see FIG. 2) based on the print data while transporting the paper 50 (the CPU 11 functions as information formation control unit). If the command transmitted through the network is a registration command, the CPU 11 stores the later transmitted registration data in the external memory 26 attached to the printer 2 (the CPU 11 functions as storage control unit). In this case, the CPU 11 continues to store the registration data in the external memory 26 (storage unit in the invention) of the printer 2 until reception of a registration termination command.

When the host apparatus 3 causes the printer 2 to form an image, the CPU 31 of the host apparatus 3 performs various types of processing based on a program stored in the ROM 32 and input signals from the keyboard 36 and the mouse 37 and transmits image data processed in the controller 30 through the network together with a print request while displaying various pieces of information on the display 38.

Figure 2A:
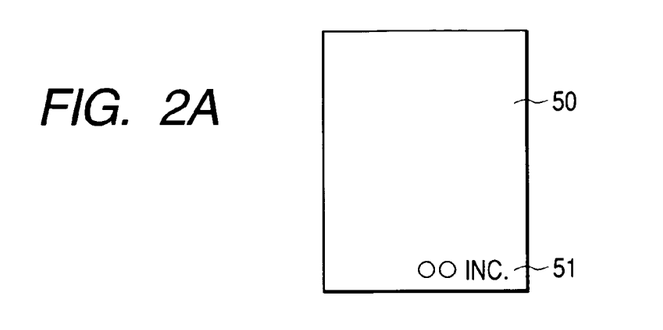
FIGS. 2A to 2C are schematic representations to show image data transmitted from a host apparatus to a printer.
Figure 2B:
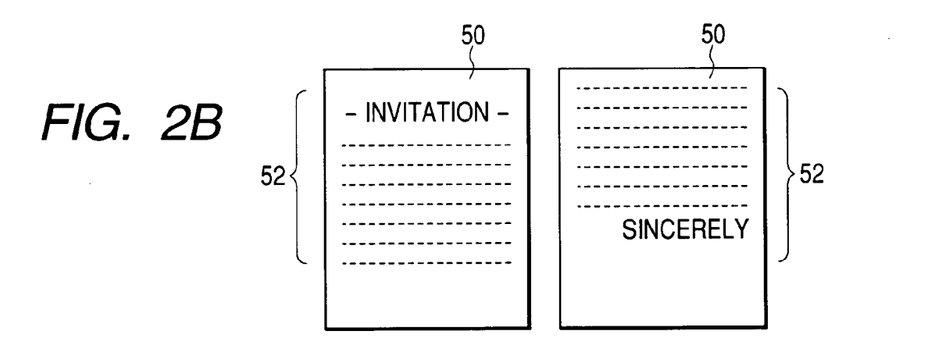

The image data transmitted from the host apparatus 3 to the printer 2 includes fixed-image data and body-image data. When the fixed-image data is printed, a fixed image as shown in FIG. 2A is formed; when the body-image data is printed, a body image 52 as shown in FIG. 2B is formed.

The fixed-image data contains image data of logotype and company name, and is printed on each sheet of the paper 50 on which an image is formed by the printer 2. The body-image data contains data of a usual document prepared by word processing software.

Figure 2C:
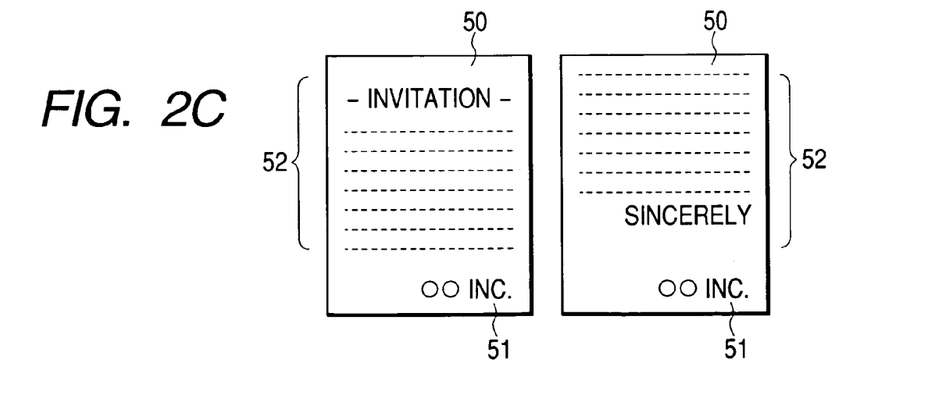

When fixed-image data and body-image data are transmitted from the host apparatus 3 to the printer 2, the printer 2 prints each fixed image 51 near the bottom of the paper 50 with the body image 52 printed thereon, as shown in FIG. 2C.

Figure 3:
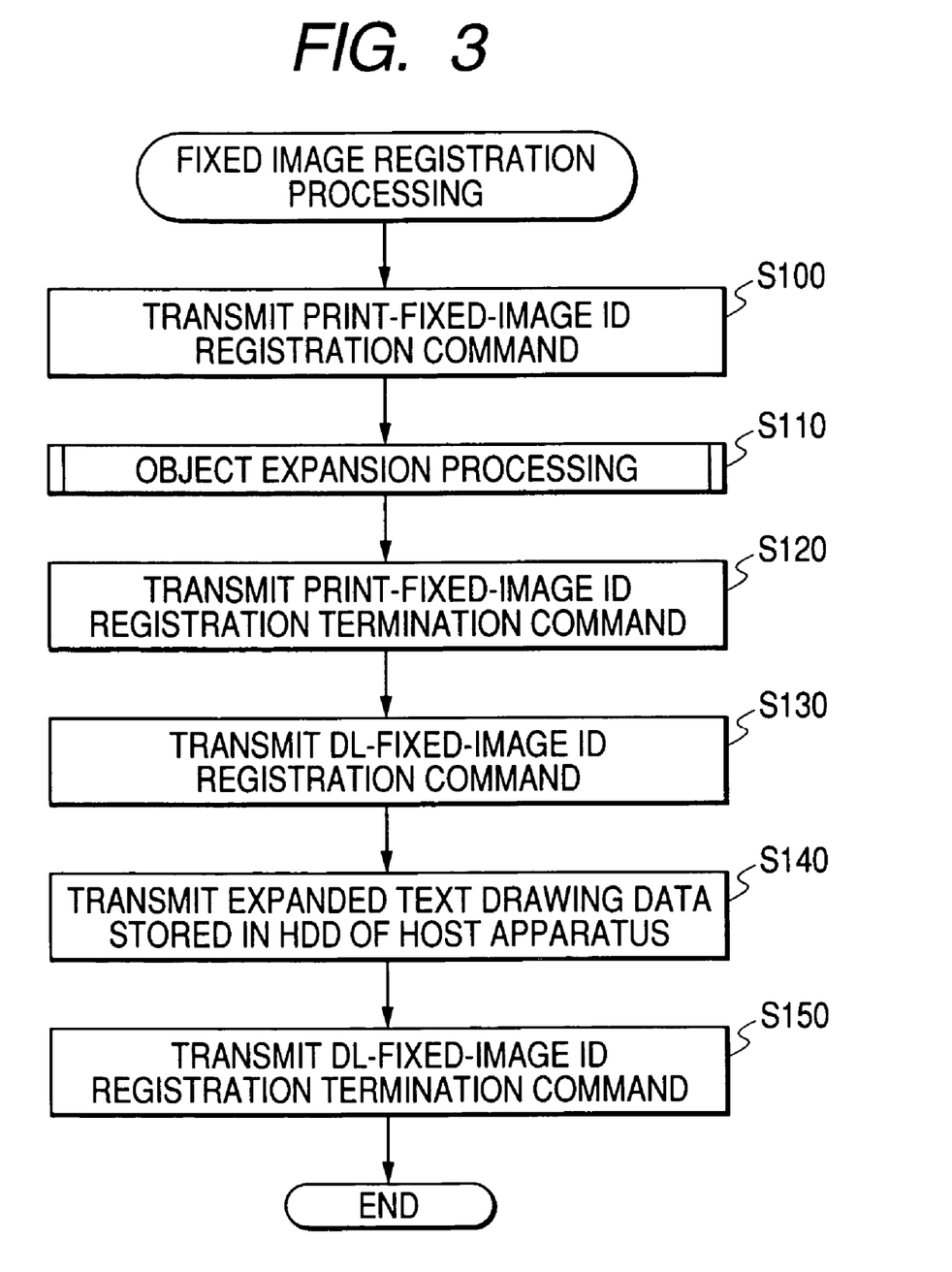
FIG. 3 is a flowchart to show fixed image registration processing.
Figure 4:
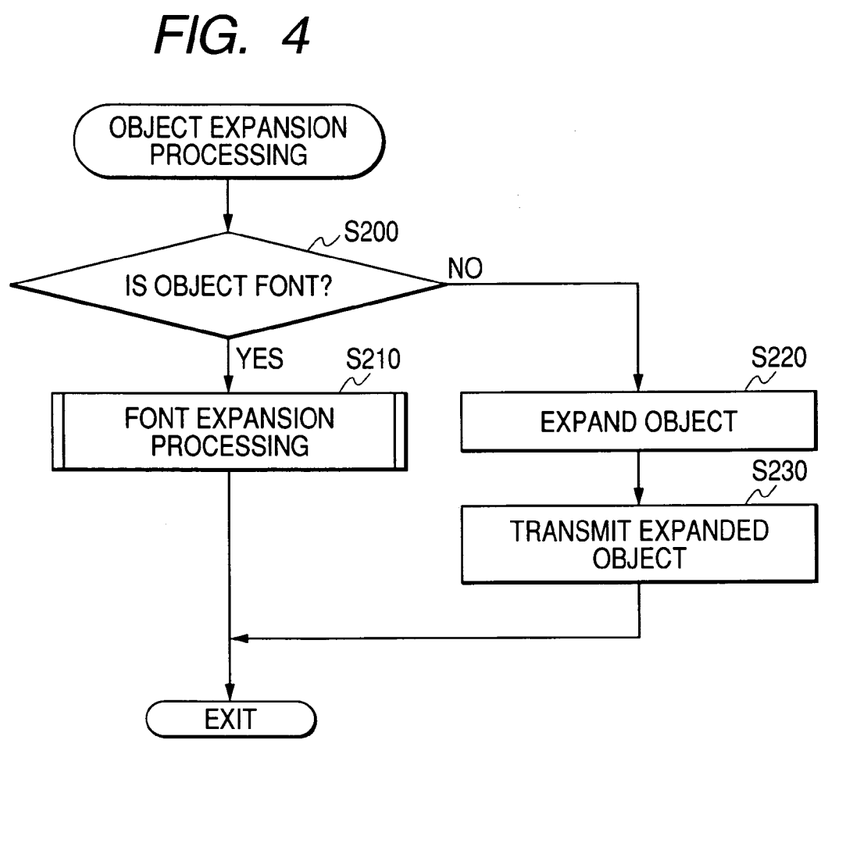
FIG. 4 is a flowchart to show object expansion processing.
Figure 5:
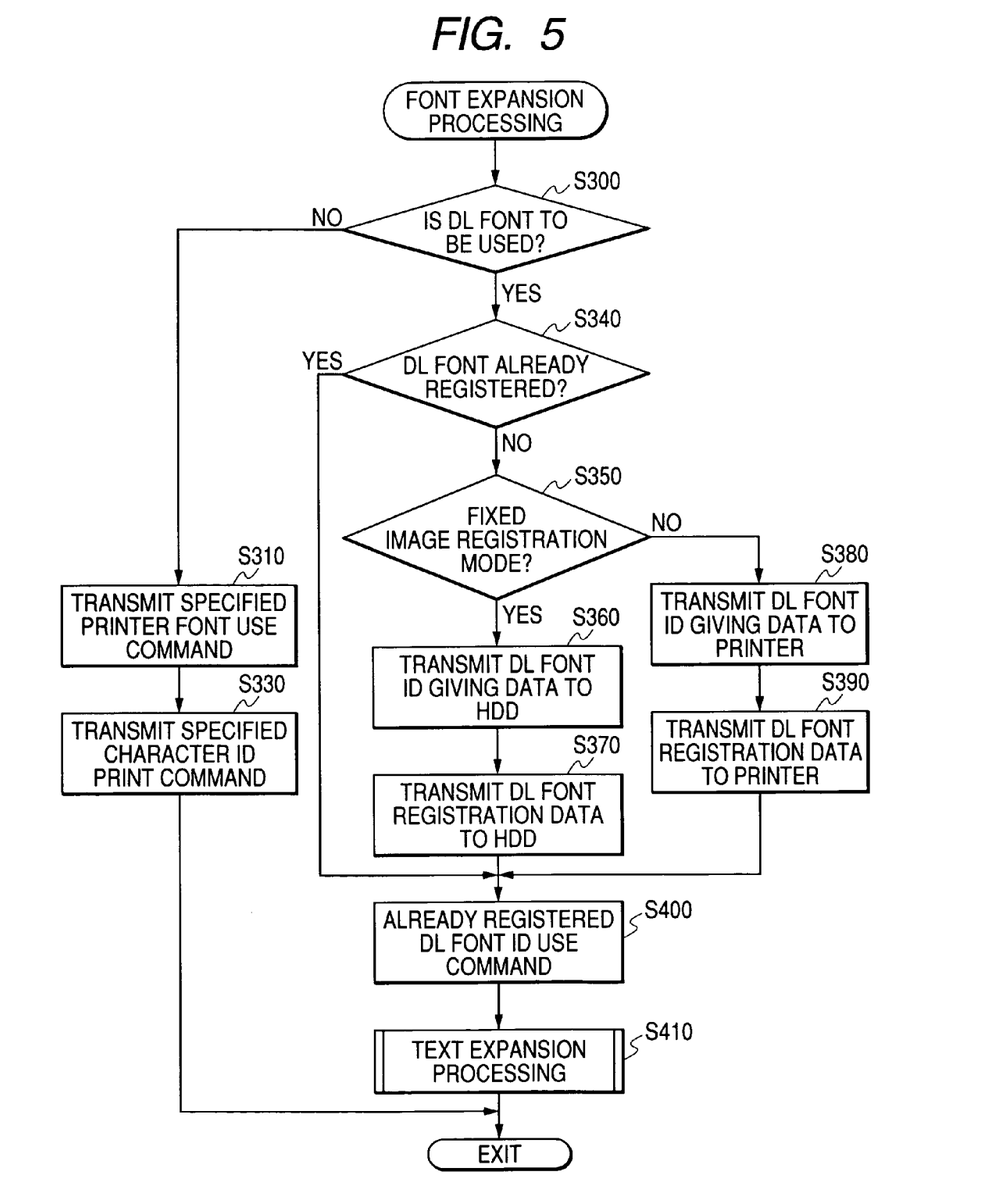
FIG. 5 is a flowchart to show font expansion processing.
Figure 6:
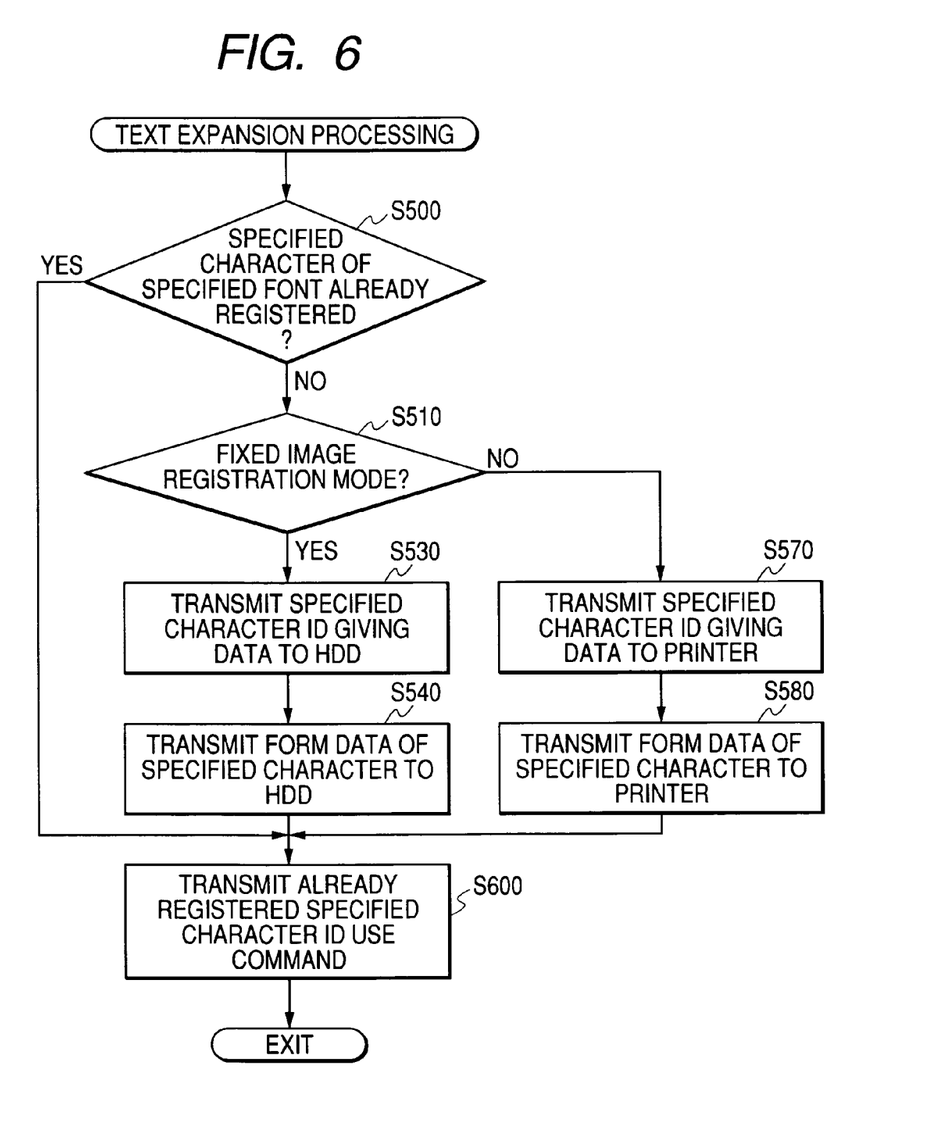
FIG. 6 is a flowchart to show text expansion processing.

Hereinafter, fixed image registration processing for transmitting fixed-image data from the host apparatus 3 to the printer 2 and storing in the printer 2 prior to formation of the above-described fixed image 51 will be discussed with reference to FIGS. 3 to 6. FIG. 3 is a flowchart to show fixed image registration processing executed by the CPU 31 of the host apparatus 3. FIG. 4 is a flowchart to show object expansion processing in the fixed image registration processing and image data transmission processing later described with reference to FIG. 7. FIG. 5 is a flowchart to show font expansion processing in the object expansion processing. FIG. 6 is a flowchart to show text expansion processing in the font expansion processing.

The process S380 in the font expansion processing shown in FIG. 5 and the process S570 in the text expansion processing shown in FIG. 6, respectively serve functions of a character identification data determination unit and a character identification data transmission unit of the invention. The process S390 in the font expansion processing shown in FIG. 5 and the process S580 in the text expansion processing shown in FIG. 6, serve a function of text drawing data transmission unit of the invention.

The fixed image registration processing shown in FIG. 3 is started when the user selects the fixed image 51 to be registered as a fixed image with an input device such as a keyboard 36 and a mouse 37. When the fixed image registration processing is started, a print-fixed-image ID registration command is transmitted to the printer 2 at S100. After this, the data transmitted to the printer 2 is registered in the external memory 26 of the printer 2 until a DL(download)-fixed-image ID registration termination command is transmitted to the printer 2 (S150). The print-fixed-image ID is an identifier given to the transmitted fixed-image data to distinguish the fixed image 51 to be registered from another fixed image.

Next, the process proceeds to S110 and object expansion processing is executed as described later. The object expansion processing is processing of converting objects (pictures and text) contained in the fixed-image data into the data format that can be recognized in the printer 2. The object expansion processing is executed repeatedly until expansion processing of the whole fixed-image data or the body-image data of one page is complete.

In the object expansion processing, the text drawing data (fixed-image/text drawing data, or first text drawing data) of the expanded fixed-image data is stored in the HDD 34 of the host apparatus 3 together with DL font ID described later. The remaining fixed-image data except for the text drawing data (data including the DL font ID and specified character ID described later) is transmitted to the printer 2.

Next, the process proceeds to S120 and a print-fixed-image ID registration termination command is transmitted to the printer 2. Then, the process proceeds to S130.

At S130, a DL-fixed-image ID registration command is transmitted to the printer 2. The DL-fixed-image ID is an identifier given to text drawing data to prevent DL font registration processing from being repeated when the same fixed image is inserted repeatedly. The DL-fixed-image ID registration command is a command for registering the identifier in the printer 2.

Next, the process proceeds to S140 and the text drawing data stored in the HDD 34 of the host apparatus 3 is transmitted to the printer 2.

At S150, a DL-fixed-image ID registration termination command is transmitted to the printer 2 for terminating the fixed image registration processing.

In the fixed image registration processing, the printer 2 receives the fixed-image data except the text drawing data to which the print-fixed-image ID is given from the host apparatus 3 at S100 to S120 and stores the data in a predetermined location of the external memory 26 of the printer 2. Likewise, the printer 2 receives the text drawing data to which the DL-fixed-image ID is given from the host apparatus 3 at S130 to S150 and stores the data in a predetermined location of the external memory 26 of the printer 2.

Next, the object expansion processing at S110 of the fixed image registration processing (see FIG. 3) will be discussed with FIG. 4. The object expansion processing shown in FIGS. 4 to 6 is processing used not only in the fixed image registration processing (see FIG. 3), but also in image data transmission processing (see FIG. 7) and therefore the object expansion processing in the image data transmission processing will also be discussed together.

In the object expansion processing shown in FIG. 4, at S200, whether or not the object to be expanded (data contained in fixed-image data in the fixed image registration processing; data contained in body-image data in the image data transmission processing) is font is determined. If it is not determined that the object to be expanded is font, the process proceeds to S220 and the object is expanded in the data format that can be recognized in the printer 2. Then, at S230, the expanded object is transmitted to the printer 2 and the object expansion processing routine is exited.

If it is determined at S200 that the object to be expanded is font, the process proceeds to S210 and the font expansion processing described later is executed. Then, the object expansion processing routine is exited.

Next, the font expansion processing at S210 will be discussed with reference to FIG. 5.

In the font expansion processing shown in FIG. 5, at S300, the CPU 31 determines whether or not DL font of the text drawing data downloaded from the host apparatus 3 to the printer 3 is to be used is determined. If it is determined that the DL font is to be used, the process proceeds to S340; if it is not determined that the DL font is to be used, the process proceeds to S310.

At S310, a command to use the specified printer font of the text drawing data previously included in the printer 3 is transmitted and the process proceeds to S330.

Next, at S330, the specified character ID to determine the character to be used in the specified printer font is transmitted as a print command and the font expansion processing routine is exited.

At S340, whether or not the specified DL font is already registered is determined. If it is determined that the specified DL font is already registered, the process proceeds to S400; if it is not determined that the specified DL font is already registered, the process proceeds to S350.

At S350, whether or not the mode is fixed image registration mode is determined. If it is determined that the mode is fixed image registration mode, the process proceeds to S360; if it is not determined that the mode is fixed image registration mode, the process proceeds to S380.

At S360, DL font ID (character identification data) giving data is stored in the HDD 34 and the process proceeds to S370. The DL font ID is an identifier given to registration data to identify the DL font in association with the print-fixed-image ID.

At S370, DL font registration data of DL font name and basic form data (header data) is stored in the HDD 34 and the process proceeds to S400.

At S380, the DL font ID (character identification data) giving data is transmitted to the printer 2 and the process proceeds to S390.

At S390, the DL font registration data is transmitted to the printer 2 and the process proceeds to S400. At the termination of S370 or S390, the CPU 31 stores in the HDD 34 of the host apparatus 3 information indicating that unregistered DL font has been registered.

Next, at S400, a command to use the already registered DL font ID is transmitted and at S410, text expansion processing is executed. Then, the font expansion processing routine is exited.

Next, the text expansion processing at S410 will be discussed with reference to FIG. 6.

At S500, whether or not the specified character of the specified font is already registered is determined. If it is determined that the specified character of the specified font is already registered, the process proceeds to S600; if it is not determined that the specified character of the specified font is already registered, the process proceeds to S510.

At S510, whether or not the mode is fixed image registration mode is determined. If it is determined that the mode is fixed image registration mode, the process proceeds to S530; if it is not determined that the mode is fixed image registration mode, the process proceeds to S570.

Next, at S530, data to give the specified character ID used to identify each character is transmitted to the HDD 34.

The process proceeds to S540 and the form data of the specified character is transmitted to the HDD 34. Then, the process proceeds to S600.

On the other hand, at S570, data to give the specified character ID used to identify each character is transmitted to the printer 2.

The process proceeds to S580 and the form data of the specified character is transmitted to the printer 2. Then, the process proceeds to S600.

At the termination of S540 or S390, the CPU 31 assumes that unregistered character of the specified font has been registered, and stores the fact in the HDD 34 of the host apparatus 3.

At S600, an already registered character ID use command is transmitted to the printer 2 and the text expansion processing routine is exited.

Figure 7:
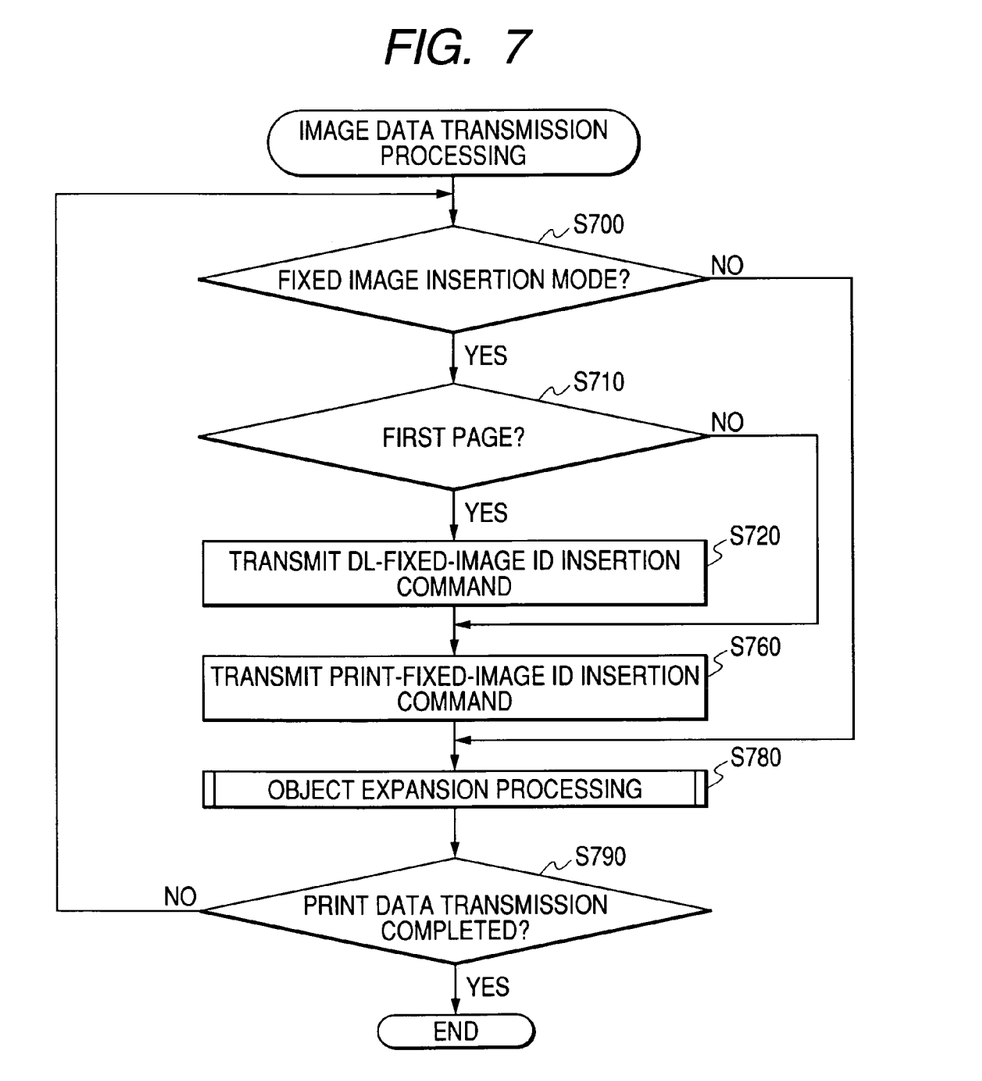
FIG. 7 is a flowchart to show image data transmission processing in the first embodiment of the invention.

Next, processing in printing the registered fixed image 51 together with a body image will be discussed with FIG. 7. FIG. 7 is a flowchart to show the image data transmission processing executed by the CPU 31 of the host apparatus 3.

In the image data transmission processing shown in FIG. 7, at S700, whether or not the mode is fixed image insertion mode for executing fixed image print is determined. If it is determined that the mode is fixed image insertion mode, the process proceeds to S710; if it is not determined that the mode is fixed image insertion mode, the process proceeds to S780.

Next, at S710, whether or not the image data to be printed is the first page is determined. If it is determined that the image data is the first page, the process proceeds to S720 and a DL-fixed-image ID insertion command to insert the fixed image character form data stored in the external memory 26 of the printer 2 is transmitted. Then, the process proceeds to S760.

At this time, the CPU 11 of the printer 2 reads the data for the received DL-fixed-image ID from the external memory 26, interprets the data, and stores the character form data for the DL font in the RAM 13 in association with the DL font ID and the character ID. The CPU 11 makes it possible to use all DL font used in the fixed-image data. Consequently, to repeatedly insert the same fixed image into a plurality of pages, the need for the host apparatus 3 to transmit a DL-fixed-image ID insertion command is eliminated.

Therefore, if it is not determined at S710 that the image data to be printed is the first page, S720 is skipped and the process proceeds to S760.

At S760, a print-fixed-image ID insertion command to insert the fixed-image data stored in the external memory 26 is transmitted. Then, the process proceeds to S780.

At S780, the object expansion processing previously described with reference to FIGS. 5 and 6 is executed and the process proceeds to S790.

At S790, whether or not the image data transmission is complete at the current page being printed is determined. If it is not determined that the image data transmission is complete at the current page being printed, the process returns to S700 and the process starting at S700 is repeated. If it is determined that the image data transmission is complete, the image data transmission processing is terminated.

Figure 8A:
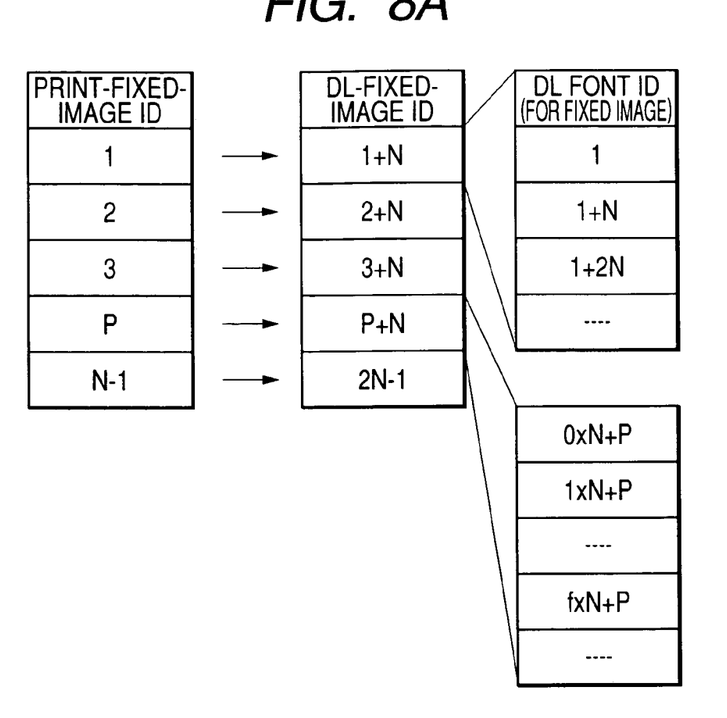
FIGS. 8A to 8C are schematic representations to schematically show the configuration of IDs given to registered data.
Figure 8B:
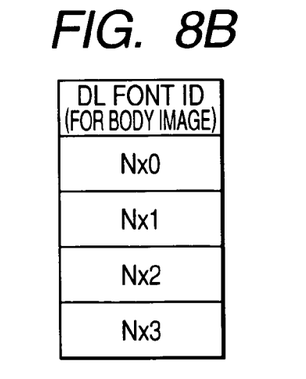
Figure 8C:
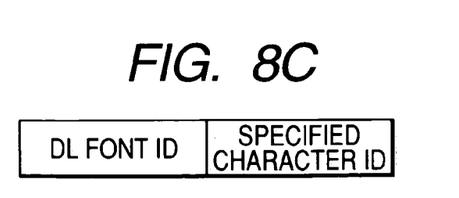

Next, the character identification data determined according to the processing described above will be discussed with FIG. 8. FIGS. 8A to 8C are schematic representations to schematically show the configuration of IDs given to data registered in the external memory 26 of the printer 2.

In the fixed image registration processing, the three types of IDs of print-fixed-image ID, DL-fixed-image ID, and DL font ID are given in stages, as shown in FIG. 8A.

First, the print-fixed-image IDs assigned by numerals are given to the whole data except data concerning DL font registration in the fixed-image data to be registered (S100) and are stored in the external memory 26 of the printer 2. Next, the DL-fixed-image IDs are given to the whole data concerning registration of the DL font contained in the fixed-image data (S130) and are stored in the external memory 26 of the printer 2. The DL-font in the fixed-image data is given the DL font ID in the data format provided by combining the print-fixed-image ID or the DL-fixed-image ID (S370). The DL-fixed-image ID needs to be determined so as not to be duplicate with the print-fixed-image ID.

Therefore, for example, assuming that the print-fixed-image IDs are 1 to (N-1) where N is a natural number, if the DL-fixed-image ID is a value provided by adding N to the print-fixed-image ID, the DL-fixed-image ID is not duplicate with the print-fixed-image ID.

If the DL font ID to the DL font in the fixed image is started at the same value as the print-fixed-image ID and is set to a value to which N is added each time a new DL font is registered, the DL font ID assigned to each fixed image ID is not duplicate.

On the other hand, in the image data transmission processing, the DL font ID is given to the text drawing data used in the body-image data (S390), as shown in FIG. 8B. The DL font ID is assigned a numeric value not used in the print-fixed-image IDs. That is, for example, if the DL font ID is started at N and is set to a value to which N is added each time a new DL font is registered, the DL font ID assigned to each fixed image ID is not duplicate.

Further, in the text expansion processing, the specified character ID is added to the DL font ID (S530 and S570), as shown in FIG. 8C.

In the image forming system described above in detail, the host apparatus 3 determines the DL font ID (character identification data) proper to each text drawing data, the data to uniquely identify the fixed image stored in the external memory 26 of the printer 2 and the text drawing data contained in the body (fixed-image/text drawing data and body-text drawing data) (character identification data determination unit), and transmits the DL font ID (character identification data transmission unit). The printer (image forming apparatus) 2 stores the text drawing data and the DL font ID transmitted from the host apparatus 3 in the external memory 26 of the printer 2 in association with each other (storage control unit) and upon reception of an image formation command containing the character identification data, the printer 2 reads the text drawing data identified by the character identification data from the external memory 26 of the printer 2 and forms an image (image formation control unit).

Therefore, if the image forming system 1 is used, even if the fixed-image data contains the fixed-image/text drawing data, different DL font IDs are given to the fixed-image/text drawing data and the body-text drawing data (second text drawing data) for storage in the external memory 26 of the printer 2, so that the DL font IDs of the fixed-image/text drawing data and the body-text drawing data do not become duplicate and appropriate text drawing data can be used to print.

Further, the host apparatus 3 transmits different fixed-image/text drawing data in a plurality of pieces of fixed-image data and determines different DL font ID for each fixed-image/text drawing data, so that the DL font IDs of different fixed-image/text drawing data can be prevented from becoming duplicate and appropriate text drawing data can be used to print.

If the fixed-image/text drawing data to be transmitted matches the previously transmitted fixed-image/text drawing data, transmission of the fixed-image/text drawing data is skipped (S710), so that the number of times the fixed-image/text drawing data is transmitted can be decreased and the processing of the image forming system 1 can be lessened. Again registering the same data in the already registered DL font may be unpermitted depending on the command system of the system to be used, even in which case a fixed image can be printed.

Further, if the body-text drawing data and the fixed-image/text drawing data are the same text drawing data, the host apparatus 3 determines the DL font ID proper to each text drawing data, so that it becomes unnecessary to determine whether or not the body-text drawing data and the fixed-image/text drawing data are the same and thus the processing of the image forming system 1 can be lessened.

The IDs given to registered data are not limited to the IDs consisting only of digits as shown in FIGS. 8A and 8B; for example, each ID may be made up of digits and letters. In this case, for example, if the print-fixed-image IDs are 0P, 1P, 2P . . . , the DL-fixed-image IDs are set to 0D, 1D, 2D . . . , corresponding to the numeric values of the print-fixed-image IDs.

Figure 9A:
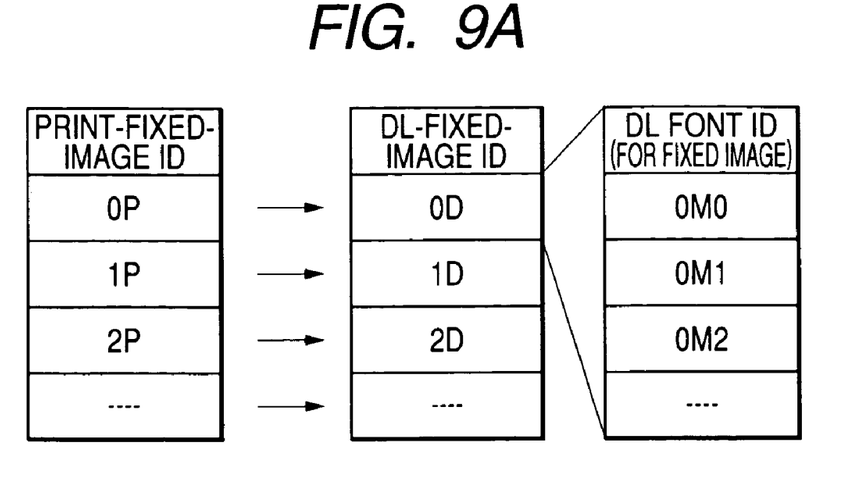
FIGS. 9A and 9B are schematic representations to schematically show the configuration of IDs in a modification.

For example, if the DL font ID to the DL font in the fixed image functions as the print-fixed-image ID, 0D, the DL font ID is started at 0M0 and is set to 0M1, 0M2 . . . each time a new DL font is registered. In doing so, the DL font ID assigned to each fixed image ID is not duplicate either.

Figure 9B:
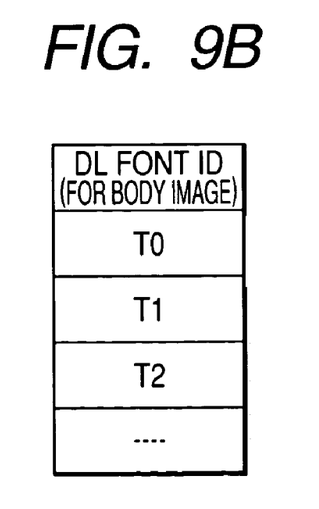

On the other hand, the DL font ID given to the text drawing data used in the body-image data may be assigned like T0, T1 . . . by combining the numeric value representing the registration order of the text drawing data contained in the body-image data and a letter not used in the print-fixed-image ID (in the embodiment, T), for example, as shown in FIG. 9B.

Even in doing so, the type of DL font ID to the text drawing data can be determined by the letter added to the digit, so that management in assigning the DL font IDs can be conducted easily.

In the fixed image registration processing in the first embodiment, the fixed-image data, etc., is stored in the external memory 26 of the printer 2 that can be provided with a comparatively large capacity. However, the configuration need not necessarily be adopted; for example, the data transmitted from the host apparatus 3 may be stored in any other storage medium such as the RAM 13 of the printer 2 (see FIG. 1).

Second Embodiment

Hereinafter, an image forming system 1 of a second embodiment will be discussed. The image forming system 1 in the embodiment differs from the image forming system 1 in the first embodiment only in fixed image registration processing and image data transmission processing; the image forming system 1 in the second embodiment has a similar hardware configuration to that of the image forming system 1 in the first embodiment. Therefore, only the differences there between will be discussed in detail and parts similar to those previously described with reference to the accompanying drawings are denoted by the same reference numerals in the second embodiment and will not be discussed again.

Figure 10:
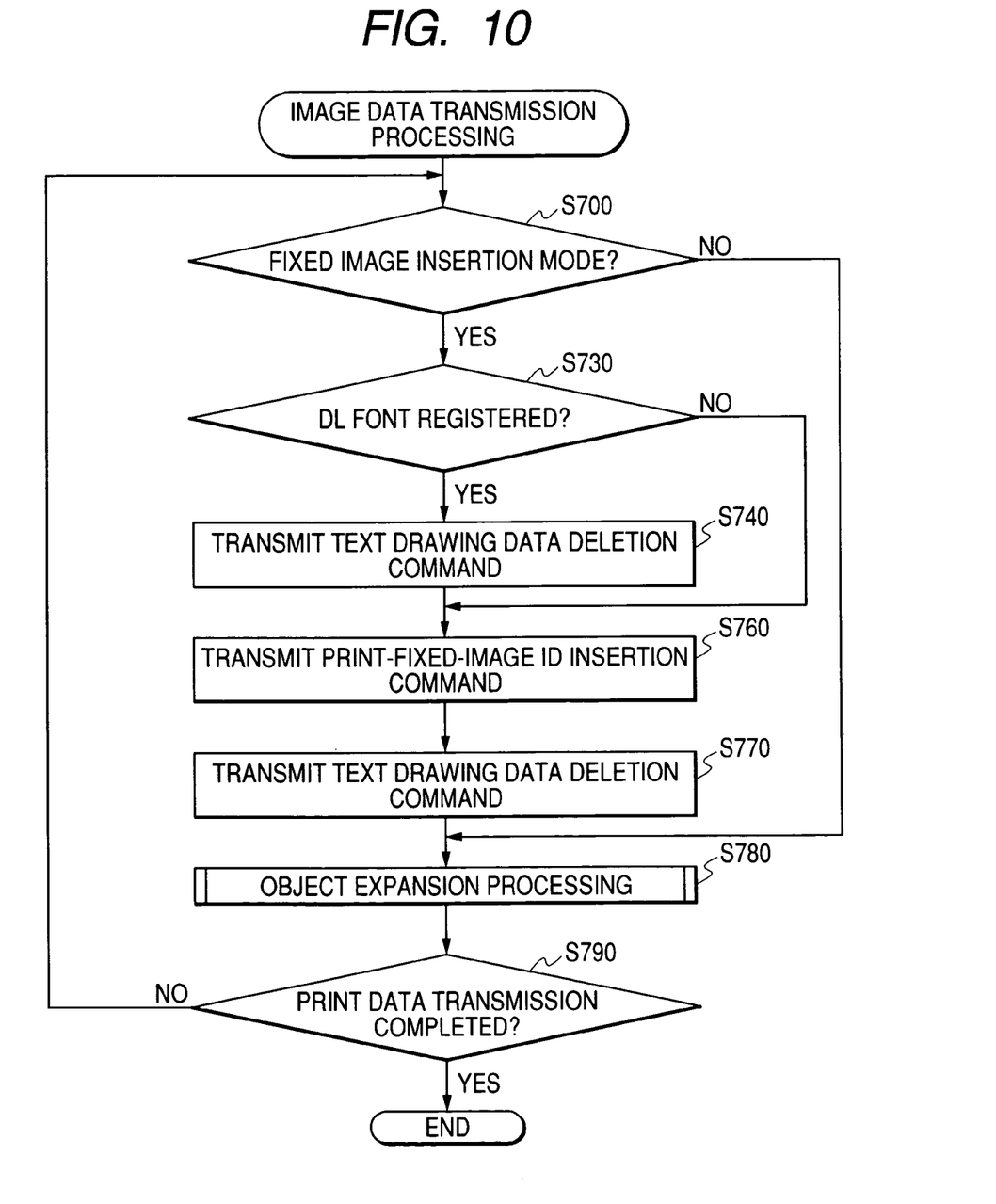
FIG. 10 is a flowchart to show image data transmission processing in a second embodiment of the invention.

In the image data transmission processing in the second embodiment, S710 to S760 in FIG. 7 are replaced with S730 to S770 shown in FIG. 10.

In the image data transmission processing shown in FIG. 10, if it is determined at S700 that the mode is fixed image insertion mode for inserting fixed-image data, the process proceeds to S730 and whether or not DL font has been registered in processing to the preceding page in the body is determined. If it is determined that registered DL font exists, the process proceeds to S740; if it is not determined that registered DL font exists, the process proceeds to S760.

Next, at S740, a command to delete text drawing data stored in external memory 26 of a printer 2 is transmitted to the printer 2. Upon reception of the command, the printer 2 deletes the text drawing data stored in the external memory 26.

Next, at S760, a print-fixed-image ID insertion command is sent and at S770, a command to delete text drawing data stored in the external memory 26 of the printer 2 is transmitted to the printer 2 as at S740.

Thereafter, similar processing to the image data transmission processing shown in FIG. 7 is executed.

Since font expansion processing is executed in the image data transmission processing as described above, S130 to S150, S350 to S370, and S530 and S540 executed in the fixed image registration processing become unnecessary.

The processing of a host apparatus 3 at S740 and S770 for transmitting the deletion command functions as data invalidation command transmission unit in the invention, and the processing of the printer 2 receiving the deletion command functions as text drawing data erasure unit in the invention.

If the deletion command is required for each registered DL font ID, a CPU 31 gives the DL font ID based on the already registered DL font IDs stored in an HDD 34 and transmits a DL font deletion command at S740.

On the other hand, S770 becomes unnecessary because a list of already registered DL font IDs does not exist in the HDD 34 in the image data transmission processing; instead, S770 becomes necessary following S110.

In the image forming system 1 as described above in detail, the host apparatus 3 transmits an invalidation command (deletion command) for invaliding the text drawing data stored in the external memory 26 of the printer 2 to the printer 2 after completion of image formation (after print command transmission) (invalidation command transmission unit). Upon reception of the invalidation command, the printer 2 erases the text drawing data stored in the external memory 26 of the printer 2 (text drawing data erasure unit).

Therefore, the text drawing data can be prevented from becoming duplicate and appropriate text drawing data can be used to print.

In a case where the fixed-image/text drawing data to print text data contained in fixed-image data to form a fixed image and the body-text drawing data to print text other than the text data contained in the fixed-image data are stored in the storage unit without distinguishing them from each other, it becomes impossible to distinguish between the fixed-image/text drawing data and the body-text drawing data and it is feared that it may become impossible to print using any desired text drawing data.

However, in the above described embodiments, the character identification data determination unit of the host apparatus determines the character identification data proper to the fixed-image/text drawing data and the character identification data proper to the body-text drawing data, and the character identification data transmission unit transmits the character identification data determined by the character identification data determination unit to the image forming apparatus.

And in the image forming apparatus, the storage control unit stores the text drawing data transmitted by the text drawing data transmission unit in the host apparatus and the character identification data transmitted by the character identification data transmission unit in the storage unit in association with each other. Upon reception of an image formation command containing the character identification data, the image formation control unit causes the image formation unit to form an image using the text drawing data stored in the storage unit in association with the character identification data.

Therefore, with the image forming system according to the embodiments, even if the fixed-image data contains the fixed-image/text drawing data, different character identification data is given to the fixed-image/text drawing data and the body-text drawing data for storage in the storage unit, so that the character identification data of the fixed-image/text drawing data and that of the body-text drawing data do not become duplicate and appropriate text drawing data can be used to print.

Incidentally, if the character identification data assigned to the fixed-image/text drawing data and that assigned to the body-text drawing data are determined as different character identification data, the character identification data may be determined at random. If at least a part of the character identification data is a digit, the character identification data determination unit is preferable to be configured to determine the character identification data containing a numeric value selected out of different numeric area for each text drawing data. Accordingly, the type of character identification data can be determined by the numeric area of the character identification data. The character identification data determination unit may be configured to determine the character identification data having a different character added to the digit for each text drawing data. Accordingly, the type of character identification data can be determined by the character added to the digit, so that management in assigning the character identification data can be conducted easily in both the image forming systems.

The text drawing data transmission unit is preferable to be configured to transmit different fixed-image/text drawing data, and the character identification data determination unit determines different character identification data for each fixed-image/text drawing data.

Accordingly, if a plurality of pieces of fixed-image data exist, the character identification data of different fixed-image/text drawing data can be prevented from becoming duplicate and appropriate text drawing data can be used to print.

It is desirable that if the fixed-image/text drawing data to be transmitted matches the previously transmitted fixed-image/text drawing data, the text drawing data transmission unit should skip transmission of the fixed-image/text drawing data.

Accordingly, the number of times the fixed-image/text drawing data is transmitted can be decreased, so that the processing of the image forming system can be lessened.

Further, if the body-text drawing data and the fixed-image/text drawing data are the same text drawing data, the character identification data determination unit may be configured to determine character identification data proper to each text drawing data.

Accordingly, it becomes unnecessary to determine whether or not the body-text drawing data and the fixed-image/text drawing data are the same and thus the processing of the image forming system can be lessened.

In a case where the fixed-image/text drawing data and the body-text drawing data are stored in the storage unit without distinguishing them from each other, it becomes impossible to distinguish between the fixed-image/text drawing data and the body-text drawing data and it may become impossible to print using any desired text drawing data. However, in the embodiments, upon completion of image formation processing executed by the image formation unit, the invalidation command transmission unit in the host apparatus transmits an invalidation command for invaliding the text drawing data stored in the storage unit. In the image forming apparatus, upon reception of the invalidation command, the text drawing data erasure unit erases the text drawing data stored in the storage unit.

Accordingly, whenever the image formation processing is complete, the text drawing data stored in the storage unit is erased, so that the text drawing data can be prevented from becoming duplicate and appropriate text drawing data can be used to print.

The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. An image forming system comprising a host apparatus and an image forming apparatus,
   wherein the host apparatus comprises:
   a text drawing data transmission unit that transmits text drawing data including first text drawing data for printing a character contained in a fixed image placed at a predetermined position of a recording medium and second text drawing data for printing a character contained in a body;
   a character identification data determination unit that determines first and second character identification data that correspond to the first and second text drawing data, respectively, and uniquely identify the first text drawing data and the second text drawing data, respectively, wherein the character identification data determination unit determines the first character identification data to use a numeric value selected from a first predetermined area of one series of numeric values, and determines the second character identification data to use a numeric value selected from a second predetermined area of the one series of numeric values, the second predetermined area being different from the first predetermined area; and
   a character identification data transmission unit that transmits the first and second character identification data determined by the character identification data determination unit, and
   wherein the image forming apparatus comprises:
   a storage unit;
   an image formation unit;
   a storage control unit that stores the first text drawing data and the first character identification data both transmitted from the host apparatus in the storage unit in association with each other, and stores the second text drawing data and the second character identification data both transmitted from the host apparatus in the storage unit in association with each other; and
   an image formation control unit that, upon reception of an image formation command containing the first character identification data and the second character identification data, reads the first text drawing data identified by the first character identification data and stored in the storage unit, and reads the second text drawing data identified by the second character identification data and stored in the storage unit, and controls the image formation unit to form an image based on the read first and second text drawing data.

2. The image forming system according to claim 1, wherein at least a part of the character identification data is a digit, and
   wherein the character identification data determination unit determines the character identification data having a different character added to the digit for each of the text drawing data.

3. The image forming system according to claim 1, wherein the character identification data determination unit determines different character identification data for each of the text drawing data.

4. The image forming system according to claim 1, wherein in a case where the first text drawing data to be transmitted matches the previously transmitted first text drawing data, the text drawing data transmission unit skips transmission of the first text drawing data.

5. The image forming system according to claim 1, wherein in a case where the first text drawing data is the same as the second text drawing data, the character identification data determination unit determines different character identification data for each of the first text drawing data and the second text drawing data.

* * * * *